United States Patent [19]

Linden et al.

[11] 4,373,964
[45] Feb. 15, 1983

[54] ASSISTANTS FOR THE PREPARATION OF PIGMENT PASTES AND HIGH-CONCENTRATION, LOW VISCOSITY PIGMENT PASTES

[75] Inventors: Heinrich Linden; Hans Bornmann, both of Düsseldorf-Holthausen; Wolfgang Gress, Wuppertal-Elberfeld; Bernd Wegemund, Haan, all of Fed. Rep. of Germany

[73] Assignee: Henkel Kommanditgesellschaft auf Aktien, Dusseldorf-Holthausen, Fed. Rep. of Germany

[21] Appl. No.: 290,826

[22] Filed: Aug. 7, 1981

Related U.S. Application Data

[63] Continuation of Ser. No. 180,816, Aug. 25, 1980, abandoned.

[30] Foreign Application Priority Data

Aug. 27, 1979 [DE] Fed. Rep. of Germany ....... 2934528

[51] Int. Cl.$^3$ .............................................. C09D 3/64
[52] U.S. Cl. .............................................. 106/308 Q
[58] Field of Search .............. 106/308 Q, 308 N, 311; 260/453 R; 560/190

[56] References Cited

U.S. PATENT DOCUMENTS 4,071,487  1/1978  Linden et al. .................. 106/308 N

FOREIGN PATENT DOCUMENTS 344843  12/1977  Austria ........................... 106/308 N
402241  11/1965  Switzerland ..................... 106/308 N Primary Examiner—James Poer
Attorney, Agent, or Firm—Hammond & Littell, Weissenberger & Muserlian

[57] ABSTRACT

In the process for the preparation of high concentration, low-viscosity liquid pigment pastes comprising mixing pigments, a substantially non-volatile liquid organic media, a suspension assistant, and, optionally, fillers, the improvement consisting of using acidic reaction products of the reaction of:

(A) unsaturated dicarboxylic acid compounds, and
(B) an unsaturated ester of a dicarboxylic acid, which reaction product is produced by heating said component A and said component B in a weight ratio of 1:7 to 1:35 for from 1 to 25 hours at a temperature in the range of 200° to 250°, as said suspension assistant;

as well as the high concentration, low-viscosity pigment pastes and solutions of said acidic reaction products in organic liquid media.

7 Claims, 3 Drawing Figures

ASSISTANTS FOR THE PREPARATION OF PIGMENT PASTES AND HIGH-CONCENTRATION, LOW VISCOSITY PIGMENT PASTES

This application is a continuation of Ser. No. 180,816, filed Aug. 25, 1980, now abandoned.

BACKGROUND OF THE INVENTION

This invention relates to the use of reaction products of ethylenically-unsaturated dicarboxylic acids or their anhydrides, and dicarboxylic acid neutral esters with unsaturated fatty alcohols as adjuvants or assistants for the preparation of pigment pastes with a high content of pigment.

In the content of the present invention, pigment pastes are understood to be suspensions of pigments and fillers, mainly of inorganic nature, in organic liquids that are nonvolatile or difficult to volatilize.

The mixing of powdered pigments into plastics, coating materials and printing dyes poses problems with respect to the homogenizing of the pigments as well as their handling during the operation. For example, the transporting, dosing and dust-free handling of powdered pigments are highly problematical during the continuous production of colored plastics.

Pigment pastes prepared from liquid, organic media and powdered pigments are finding increasing application to eliminate these difficulties.

Suitable for the pigment pastes are pigments such as titanium dioxide types, with or without secondary treatment, natural and synthetic iron oxide pigments, chromium yellow, chromic oxide green, and molybdate red. Furthermore, powdered fillers such as silicon dioxide, calcium carbonate and dolomite can also be incorporated into the pigment paste. Suitable as the substantially non-volatile liquid organic media are among others, dioctyl phthalate, dibutyl phthalate, esters of maleic acid, esters of fatty acids, mineral oils, natural oils and their epoxidation products. The pastes are prepared with the aid of conventional mixers such as agitators, kneading machines, rolling mills or fast mixing aggregates of the dissolver type.

The pastes prepared in this manner have the disadvantage that their content of pigment is small, when the goal is a liquid preparation that is easy to measure out. For the practical application, however, it usually is necessary and economical, for example, for the coloring of plastics, to keep the liquid part of the pigment pastes as low as possible. The demand for pigment pastes with high pigment contents arises from these requirements.

Various adjuvants or assistants have been suggested that, in the form of relatively small additions, are expected to reduce the viscosity of pigment pastes and thus permit the preparation of pastes with higher pigment contents. For example, technical grade glyceryl monooleate frequently is used in actual practice. Such products, however, meet the set requirements only partially.

OBJECTS OF THE INVENTION

An object of the present invention is the development of an assistant for use in the preparation of high-concentration, low-viscosity pigment pastes in substantially non-volatile liquid organic media.

Another object of the present invention is the development of an improvement, in the process for the preparation of high-concentration, low-viscosity liquid pigment pastes comprising mixing pigments, a substantially non-volatile liquid organic media, a suspension assistant, and, optionally, fillers, the improvement consisting of using reaction products of the reaction of (A) unsaturated acidic compounds selected from the group consisting of itaconic acid, an ethene dicarboxylic acid having the formula and an ethene dicarboxylic acid anhydride having the formula wherein $R_1$ and $R_2$ are members selected from the group consisting of hydrogen and methyl, and (B) an unsaturated ester having the formula wherein $R_3$ and $R_4$ are members having 14 to 20 carbon atoms selected from the group consisting of alkenyl, alkadienyl, alkatrienyl and mixtures thereof, and A represents the acyl of an acid selected from the group consisting of itaconic acid, said ethene dicarboxylic acid, and an alkanedioic acid having the formula $$HOOC-(CH_2)_n-COOH$$

wherein n is an integer from 1 to 10, which reaction product is produced by heating said component A and said component B in a weight ratio of 1:7 to 1:35 for from 1 to 25 hours at a temperature in the range of 200° to 250° C.; as said suspension assistant.

A yet further object of the present invention is the development of the above high concentration, low-viscosity liquid pigment paste having a concentration of pigment and, optionally, filler in excess of 50% by weight.

These and other objects of the present invention will become more apparent as the description thereof proceeds.

DESCRIPTION OF THE INVENTION

We have now found that the reaction product of (A) itaconic acid, ethylene dicarboxylic acid of Formula I, or ethylene dicarboxylic acid anhydrides of Formula II, in which $R_1$ and $R_2$ represent hydrogen or a methyl radical, and (B) an ester of Formula III, in which $R_3$ and $R_4$ stand for alkenyl or alkadienyl or alkatrienyl radicals with 14 to 20 carbon atoms derived from mono- or poly-unsaturated fatty alcohols, and A represents the acyl radical of the itaconic acid, the acyl radical of an ethylene dicarboxylic acid of Formula I or the acyl radical of an aliphatic dicarboxylic acid of Formula IV, where n signifies a whole number from 1 to 10, which is prepared by heating itaconic acid, ethylene dicarboxylic acid of Formula I or ethylene dicarboxylic acid anhydride of Formula II with the ester of Formula III at a ratio by weight of 1:7 to 1:35 for 1 to 25 hours at 200° to 250° C., are excellently suitable as suspension assistants for the preparation of pigment pastes based on pigments, a liquid organic medium and, optionally, fillers.

More particularly, the suspension assistants of the present invention are reaction products of the reaction of (A) unsaturated acidic compounds selected from the group consisting of itaconic acid, and ethene dicarboxylic acid having the formula and an ethene dicarboxylic acid anhydride having the formula wherein $R_1$ and $R_2$ are members selected from the group consisting of hydrogen and methyl, and (B) an unsaturated ester having the formula wherein $R_3$ and $R_4$ are members having 14 to 20 carbon atoms selected from the group consisting of alkenyl, alkadienyl, alkatrienyl and mixtures thereof, and A represents the acyl of an acid selected from the group consisting of itaconic acid, said ethene dicarboxylic acid, and an alkanedioic acid having the formula wherein n is an integer from 1 to 10, which reaction product is produced by heating said component A and said component B in a weight ratio of 1:7 to 1:35 for from 1 to 25 hours at a temperature in the range of 200° to 250° C.

Suitable as ethylene dicarboxylic acids of Formula I are maleic acid, fumaric acid, citraconic acid, mesaconic acid, dimethylmaleic acid, dimethylfumaric acid, preferably, maleic acid; as ethylene dicarboxylic acid anhydrides of Formula II, the anhydrides of citraconic acid, dimethylmaleic acid, and, preferably, maleic acid anhydride. All members of the homologous series of malonic acid, up to dodecanedioic acid, are suitable as the aliphatic dicarboxylic acids of Formula IV.

The esters of Formula III represent known compounds that can be obtained by conventional methods from the mentioned dicarboxylic acids and mono- or poly-unsaturated fatty alcohols with 14 to 20 carbon atoms. The respective unsaturated alcohols can be prepared in technical grade from the fatty acids occurring in animal and vegetable fats or their esters with monohydric alcohols by reduction with sodium and alcohol or by catalytic hydrogenation. Chemically pure compounds are not obtained by these processes. The "technical grade, unsaturated alcohols" are mixtures of mono- and poly-unsaturated alcohols with different chain lengths that usually contain a more or less substantial amount of saturated compounds, with the composition largely dependent on the origin of the starting fatty acids. Particularly suitable for the preparation of the products to be used according to the invention are esters of Formula III, in which the radicals $R_3$ and $R_4$ stem from a technical grade oleyl alcohol or from a technical grade soy alcohol obtainable from the fatty acids of soybean oil.

The esters of Formula III are prepared advantageously by reacting the unsaturated fatty alcohols with itaconic acid, the respective ethylene dicarboxylic acids, aliphatic dicarboxylic acids or their anhydrides at the molar ratio of 2:1. The reaction partners are heated to temperatures of 120° to 250° C., and the water produced is removed continuously from the reaction mixture. In the simplest case, the water of reaction is distilled off through a descending condenser. However, the water produced may be removed from the reaction mixture also by azeotropic distillation using a suitable solvent such as xylene, while employing a reflux condenser with an interconnected water separator. The esterification is complete when the theoretically expected amount of water has been collected. Any solvent that is present is then distilled off.

For the preparation of the reaction products to by used according to the invention, the esters of Formula III (component B) are mixed with the acidic compounds of component A, that is itaconic acid, ethylene dicarboxylic acid or ethylene dicarboxylic acid anhydride in the desired ratios by weight. Subsequently, the mixture is heated to 200° to 250° C. for 1 to 25 hours. After cooling, the reaction product can be used as is. The preparation of these reaction products is described in commonly-assigned U.S. Pat. No. 4,071,487.

In those cases where the ester of Formula III is derived from itaconic acid or an ethylene dicarboxylic acid of Formula I, the reaction products to be used according to the invention may be obtained also by heating unsaturated fatty alcohol with an amount of dicarboxylic acid that is adequate for the formation of the corresponding neutral esters as well as for the continued reaction of these esters with the unsaturated dicarboxylic acid. The fatty alcohol/dicarboxylic acid mixture is heated at 160° to 250° C. for 1 to 30 hours, and the water produced during the esterification reaction is removed from the reaction mixture.

The products obtained in this manner possess excellent solubility in the organic media that are used as liquid components in the pigment paste.

The amounts of suspension assistants necessary for a good effect are, depending on the nature and condition of the pigments and/or fillers, and on the type and viscosity of the liquid medium, between 0.5% and 20% by weight, preferably between 1.0% and 10% by weight, based on the pigments to be used.

The components may be mixed with each other in any desired sequence for the preparation of the pigment pastes. Thus the reaction products to be used according to the invention may be dissolved in the organic media and the solution obtained can then be homogenized with the pigment and/or filler. It is also possible to homogenize the reaction products to be used according to the invention first with the pigments, and to add the liquid organic media then. The pigment paste produced ordinarily has a pigment concentration of 50% or higher. Intermediate products, for example, with a content of from 10% to about 50% by weight of reaction product to be used according to the invention can be produced from the reaction product of the invention and the substantially, non-volatile liquid organic media. Such an intermediate product can be utilized to make the pigment pastes. Such intermediate products have a lower viscosity than the reaction products per se and are, therefore, more readily employed commercially in the manufacture of the pigment pastes.

The following examples are illustrative of the practice of the invention without being limitative in any respect.

EXAMPLES

The fatty alcohol mixtures A and B were used for the preparation of the reaction products according to the invention from unsaturated fatty alcohols and unsaturated dicarboxylic acids. The composition and analytical data of these fatty alcohols are compiled in Table 1. These fatty alcohol mixtures can be obtained by hydrogenation of methyl esters of the fatty acids of soybean oil (A) and of technical grade oleic acid (B).

TABLE 1

| Mixtures of Fatty Alcohols | A | B |
|---|---|---|
| Percent by weight < $C_{16}$ saturated | 0.4 | 0.3 |
| Percent by weight $C_{16}$ saturated | 10.6 | 1.9 |
| Percent by weight $C_{18}$ saturated | 5.9 | 1.7 |
| Percent by weight > $C_{18}$ saturated | 6.4 | 0.5 |
| Percent by weight $C_{16}$ mono-unsaturated | — | 0.6 |
| Percent by weight $C_{18}$ mono-unsaturated | 29.4 | 92.7 |
| Percent by weight $C_{18}$ double-unsaturated | 44.5 | 2.1 |
| Percent by weight $C_{18}$ triple-unsaturated | 2.8 | 0.2 |
| Acid number | 0 | 0.7 |
| Saponification number | 0.1 | 6.4 |
| OH-number | 214 | 201 |
| Iodine number (according to Wijs) | 134.6 | 93.4 |
| Average molecule weight from OH-number | 262 | 279 |

Conjugated double bonds were present in 5.7 percent by weight of the fatty alcohol mixture A.

The color reaction of dimethyl aniline with maleic acid anhydride, described in Ber. 51: 1820, (1918), was used to determine the presence of free maleic acid anhydride in the reaction products of maleic acid anhydride with unsaturated fatty alcohols described in the following text. The carboxylic acid anhydride groups present in the reaction products were determined with the "aniline-acid number" described in Anal. Chim. Acta 2: 146–148, (1948).

The reaction products 1 to 3 from unsaturated fatty alcohols with maleic acid anhydride, the reaction product 4 from fatty alcohols and itaconic acid and the reaction product 5 from fatty alcohols and succinic acid reacted with maleic acid anhydride, described below were synthesized to determine their suitability as suspension assistants for the preparation of pigment pastes.

EXAMPLE 1

Reaction Product 1

262 gm (1 mol) of the technical grade fatty alcohol mixture A, 49 gm (0.5 mol) of maleic acid anhydride and 80 gm of xylene were agitated for 7 hours while maintained at a temperature of from 160° to 200° C. under reflux. During this time, 8.5 gm water (94.5% of theory) were removed from the reaction mixture with the aid of a water separator. Then, the xylene was distilled off under water jet vacuum.

95 gm (0.16 mol) of the neutral di-fatty alcohol maleate (acid number <5) obtained in this manner were heated to 220° C. with 5 gm (0.05 mol) of maleic acid anhydride and maintained at this temperature for 6 hours. After this, no maleic acid anhydride could be detected in the light yellow, clear reaction product. The product had an aniline-acid number of 35. Its viscosity at 20° C. was 30 Pa.s.

EXAMPLE 2

Reaction Product 2

279 gm (1 mol) of the technical grade fatty alcohol mixture B and 49 gm (0.5 mol) of maleic acid anhydride were maintained at a temperature of 160° to 200° C. for 6 hours. The water forming during the reaction was distilled continually from the reaction mixture through a descending condenser. A total of 8.5 gm water was collected. 90 gm (0.14 mol) of the obtained neutral di-fatty alcohol maleate (acid number 8.2) and 10 gm (0.1 mol) of maleic acid anhydride were heated to 240° C. and maintained at this temperature for 8 hours. No maleic acid anhydride could be detected in the light-brown reaction product. The aniline-acid number was 57, the viscosity at 20° C. was 15 Pa.s.

EXAMPLE 3

Reaction Product 3

279 gm (1 mol) of the fatty alcohol mixture B and 84.3 gm (0.86 mol) of maleic acid anhydride were heated to 160° to 250° C. for 7 hours. 8.8 gm water of reaction were distilled off. No maleic acid anhydride could be determined in the light-brown reaction product. The aniline-acid number was 51, the viscosity at 20° C. was 18 Pa.s.

EXAMPLE 4

Reaction Product 4

262 gm (1 mol) of the technical grade fatty alcohol mixture A and 65 gm (0.5 mol) of itaconic acid were heated to 150° to 220° C. for 8 hours. The amount of the water of reaction removed with the separator was 16.8 gm, 90 gm (0.145 mol) of the obtained neutral di-fatty alcohol itaconate (acid number 8.7) and 10 gm (0.077 mol) of itaconic acid were heated at 250° C. and maintained at this temperature for 6 hours. The light-yellow, clear reaction product had an aniline-acid number of 47; its viscosity at 20° C. was 2.5 Pa.s.

EXAMPLE 5

Reaction Product 5

279 gm (1 mol) of the technical grade fatty alcohol mixture B and 50 gm (0.5 mol) of succinic acid anhydride were agitated for 5 hours at 190° to 240° C. The amount of water of reaction formed, which was distilled off through a descending condenser, was 8.7 gm (96.7% of theory).

90 gm (0.14 mol) of the obtained di-fatty alcohol succinate (acid number 2.9) and 10 gm (0.1 mol) of maleic acid anhydride were heated to 250° C. and kept at this temperature for 7 hours. The dark brown reaction product had an aniline-acid number of 48.3; its viscosity at 20° C. was 0.31 Pa.s.

Comparison Substance

A commercial "glyceryl monooleate" of the following composition was used for the comparison tests described below:

glyceryl monooleate: approximately 50%
glyceryl dioleate: approximately 30%
glyceryl trioleate: approximately 20%
traces of glycerin

EXAMPLE 6

6.5 gm of reaction product 1 and 133.5 gm of di-2-ethylhexyl phthalate (DOP) were mixed in a vessel with agitator, consisting of a cylindrical metal container with a capacity of about 0.5 liter and a centrically arranged sawtooth agitator (dissolver type). With moderate agitation, 260 gm of an untreated, commercial titanium dioxide pigment, rutile form (grain size 0.2 to 0.3μ) was added in portions to the clear solution and agitated for 15 minutes with the stirrer disc at a circumferential speed of 8 m/sec.

A liquid pigment paste with a viscosity of 8.8 Pa.s at 20° C., measured with a rotation viscosimeter by Brookfield, type LVT, was obtained.

COMPARISON EXAMPLE 6a

When glyceryl monooleate (comparison substance) was used in the pigment paste according to Example 1 instead of the Reaction Product 1, a highly viscous paste was obtained, the viscosity of which could not be measured with the Brookfield viscosimeter.

COMPARISON EXAMPLE 6b

A crumbly mass was obtained on mixing 140 gm di-2-ethylhexyl phthalate and 260 gm of untreated titanium dioxide.

The properties of the pigment pastes according to Examples 6, 6a and 6b are compared in Table 2.

TABLE 2

| Example | Suspension Assistant Type | % by weight based on the pigment | Composition in % by wt. | | | Viscosity+ Pa.s | Appearance |
|---|---|---|---|---|---|---|---|
| | | | TiO$_2$ | DOP | Assistant | | |
| 6 | reaction product 1 | 2.5 | 65 | 33.4 | 1.6 | 8.8 | liquid |
| 6a | glyceryl monooleate | 2.5 | 65 | 33.4 | 1.6 | not measureable | thick paste |
| 6b | blind test | — | 65 | 35 | — | not measureable | crumbly mass |

+The viscosities were measured with a Brookfield LVT instrument spindle No. 3, at 12 rpm and 20° C.

The superior effect of Reaction Product 1 used according to the invention in comparison to glyceryl monooleate is clearly apparent from the comparison in Table 2.

EXAMPLE 7

The highest possible pigment concentration at which the paste could be sufficiently homogenized in the dissolver (see Example 6) was determined with the inclusion of Reaction Product 2 used as a suspension assistant according to the invention, an untreated titanium dioxide pigment and di-2-ethylhexyl phthalate (DOP) as liquid organic medium, at a predetermined amount of assistant of 2.5% by weight, based on the amount of pigment used. The pigment concentration in the paste was reduced by dilution with DOP in steps of 5% by weight each. The viscosity and the appearance of all prepared pastes in this dilution series were determined.

For this purpose, 175 gm of titanium dioxide and 4.4 gm of Reaction Product 2 were mixed together with a total of 70.6 gm DOP over a period of 5 minutes in the agitator vessel of the dissolver with the stirrer disc at a circumferential speed of 24 m/sec. After the determination of the viscosity and the evaluation of the appearance, the paste was diluted with 19.2 gm of DOP and homogenized for 2 minutes. The pigment concentration was reduced from 70 to 65 percent by weight by this process. The dilution series was continued with the addition of 22.5 gm and 26.5 gm of DOP.

COMPARISON EXAMPLE 7a

Analogous to Example 7, a dilution series was prepared with glyceryl monooleate (comparison substance). With an amount of 2.5% by weight suspension assistant, based on the amount of titanium dioxide, the highest possible pigment concentration was 55 percent by weight. The dilutions were performed as described in Example 7.

COMPARISION EXAMPLE 7b

Figure 1:
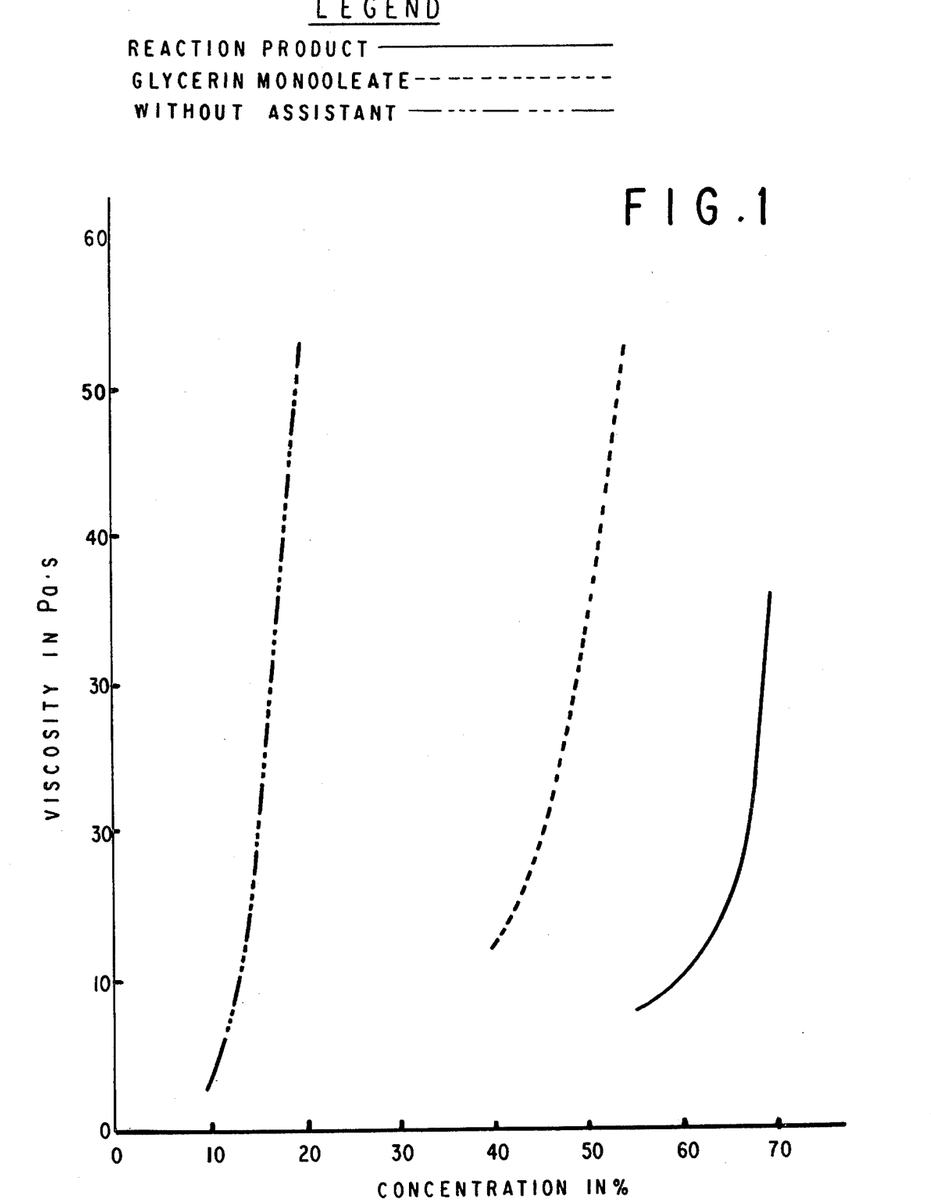
FIG. 1 is a graph of the viscosity versus the pigment concentration with the reaction product of Example 2 using $TiO_2$.

The highest possible pigment concentration for a dilution series prepared with DOP without any suspension assistant addition was 25% by weight. The compositions of all pigment pastes from Examples 7, 7a and 7b, and their properties are summarized in Table 3. The viscosities as a function of the pigment concentration were also shown in the form of a graph in FIG. 1.

viscosity values; it is especially pronounced when the appearance is taken into account.

EXAMPLE 8 and COMPARISON EXAMPLES 8a and 8b

The respective dilution series 8, 8a and 8b were prepared as described in the Examples 7, 7a and 7b, with the use of a commercial titanium dioxide subsequently treated with $Al_2O_3$, $SiO_2$ and ZnO, rutile form (grain size 0.2 to 0.3$\mu$).

Figure 2:
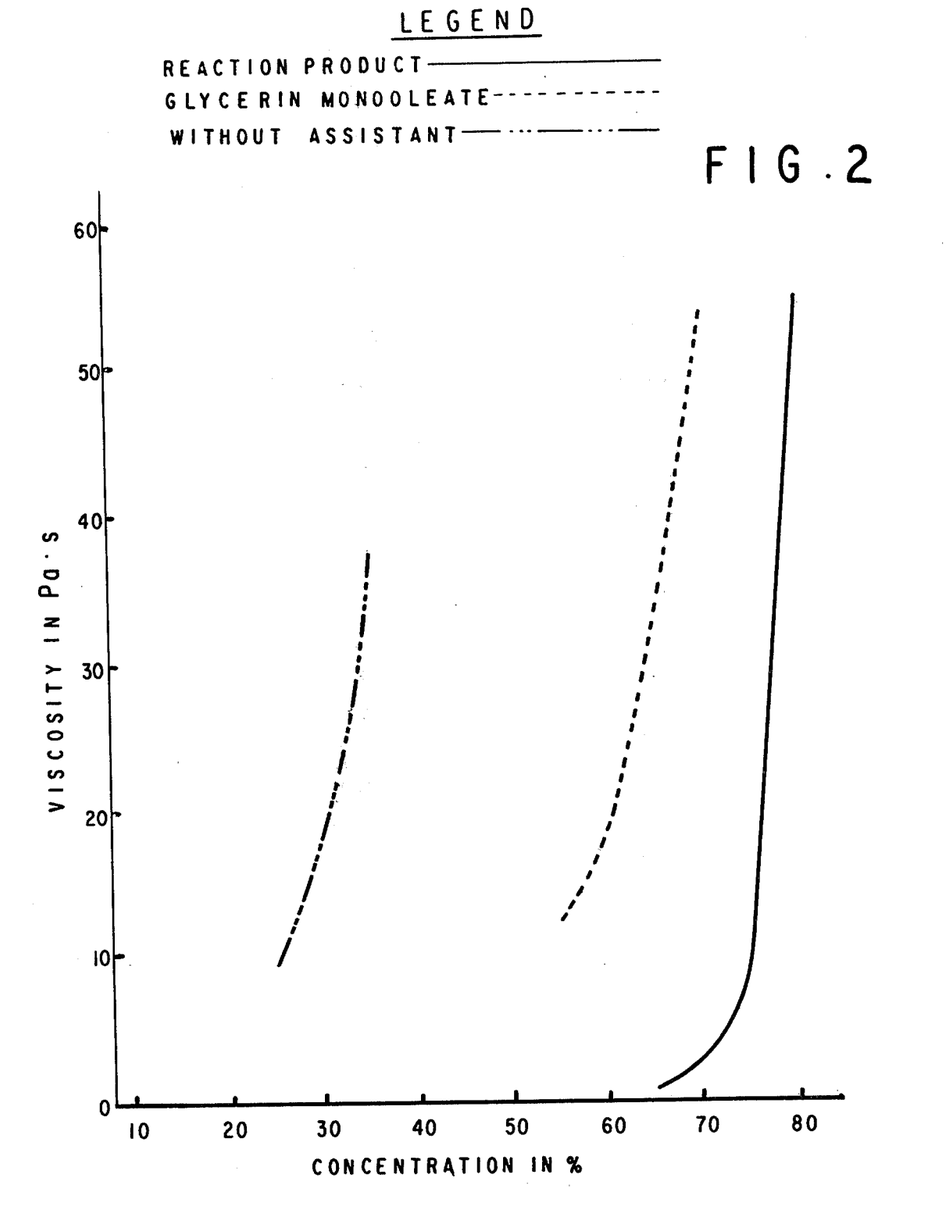
FIG. 2 is a graph of the above plot with the reaction product of Example 2 using a different form of $TiO_2$.

The results summarized in Table 4 and FIG. 2 clearly

TABLE 3

| Example | Suspension Assistant Type | % by weight based on the pigment | Composition in % by wt. $TiO_2$ | DOP | Assistant | Viscosity+ Pa.s | Appearance |
|---|---|---|---|---|---|---|---|
| 7 | reaction product 2 | 2.5 | 70 | 28.2 | 1.8 | 36 | liquid, slight structural viscosity |
| | | 2.5 | 65 | 33.4 | 1.6 | 14.7 | liquid |
| | | 2.5 | 60 | 38.5 | 1.5 | 10.0 | " |
| | | 2.5 | 55 | 43.6 | 1.4 | 8.0 | " |
| Comparison Example 7a | glyceryl monooleate | 2.5 | 55 | 43.6 | 1.4 | 53 | liquid, distinct structural viscosity |
| | | 2.5 | 50 | 48.7 | 1.3 | 32.3 | liquid, slight structural viscosity |
| | | 2.5 | 45 | 53.9 | 1.1 | 18.9 | liquid, slight structural viscosity |
| | | 2.5 | 40 | 59.0 | 1.0 | 12.2 | liquid, slight structural viscosity |
| Comparison Example 7b | blind test | — | 25 | 75 | — | not measureable | strong structural viscosity |
| | | — | 20 | 80 | — | 53 | strong structural viscosity |
| | | — | 15 | 85 | — | 18.9 | liquid, slight structural viscosity |
| | | — | 10 | 90 | — | 3.2 | liquid |

+The viscosities were measured with a Brookfield LVT-instrument spindle No. 4, at 12 rpm and 20° C.

The superiority of Reaction Product 2 to be used according to the invention is clearly apparent from the demonstrate the advantageous effect of Reaction Product 2 to be used according to the invention.

TABLE 4

| Example | Suspension Assistant Type | % by weight based on the pigment | Composition in % by wt. $TiO_2$ | DOP | Assistant | Viscosity+ Pa.s | Appearance |
|---|---|---|---|---|---|---|---|
| 8 | reaction product 2 | 2.5 | 80 | 18 | 2.0 | 55 | liquid |
| | | 2.5 | 75 | 23.1 | 1.9 | 10 | " |
| | | 2.5 | 70 | 28.2 | 1.8 | 3.8 | " |
| | | 2.5 | 65 | 33.4 | 1.6 | 1.2 | " |
| Comparison Example 8a | glyceryl monooleate | 2.5 | 70 | 28.2 | 1.8 | 54 | strong structural viscosity |
| | | 2.5 | 65 | 33.4 | 1.6 | 33.5 | liquid, |

TABLE 4-continued

| Example | Suspension Assistant Type | % by weight based on the pigment | Composition in % by wt. TiO$_2$ | DOP | Assistant | Viscosity+ Pa.s | Appearance |
|---|---|---|---|---|---|---|---|
| | | 2.5 | 60 | 38.5 | 1.5 | 18.6 | distinct structural viscosity liquid, slight structural viscosity |
| | | 2.5 | 55 | 53.6 | 1.4 | 12.4 | liquid, slight structural viscosity |
| Comparison Example 8b | blind test | — | 35 | 65 | — | 40 | strong, structural viscosity |
| | | — | 30 | 70 | — | 17.9 | liquid, slight structural viscosity |
| | | — | 25 | 75 | — | 8.4 | liquid, slight structural viscosity |
| | | — | 20 | 80 | — | 3.3 | liquid |

+The viscosities were measured with a Brookfield LVT-instrument, spindle No. 4, at 12 rpm and 20° C.

EXAMPLE 9 and COMPARISON EXAMPLES 9a and 9b

The respective dilution series 9, 9a and 9b were prepared as described in Examples 7, 7a and 7b, with the use of a commercial synthetic iron oxide red (spherical, particle size approximately 0.17μ).

Figure 3:
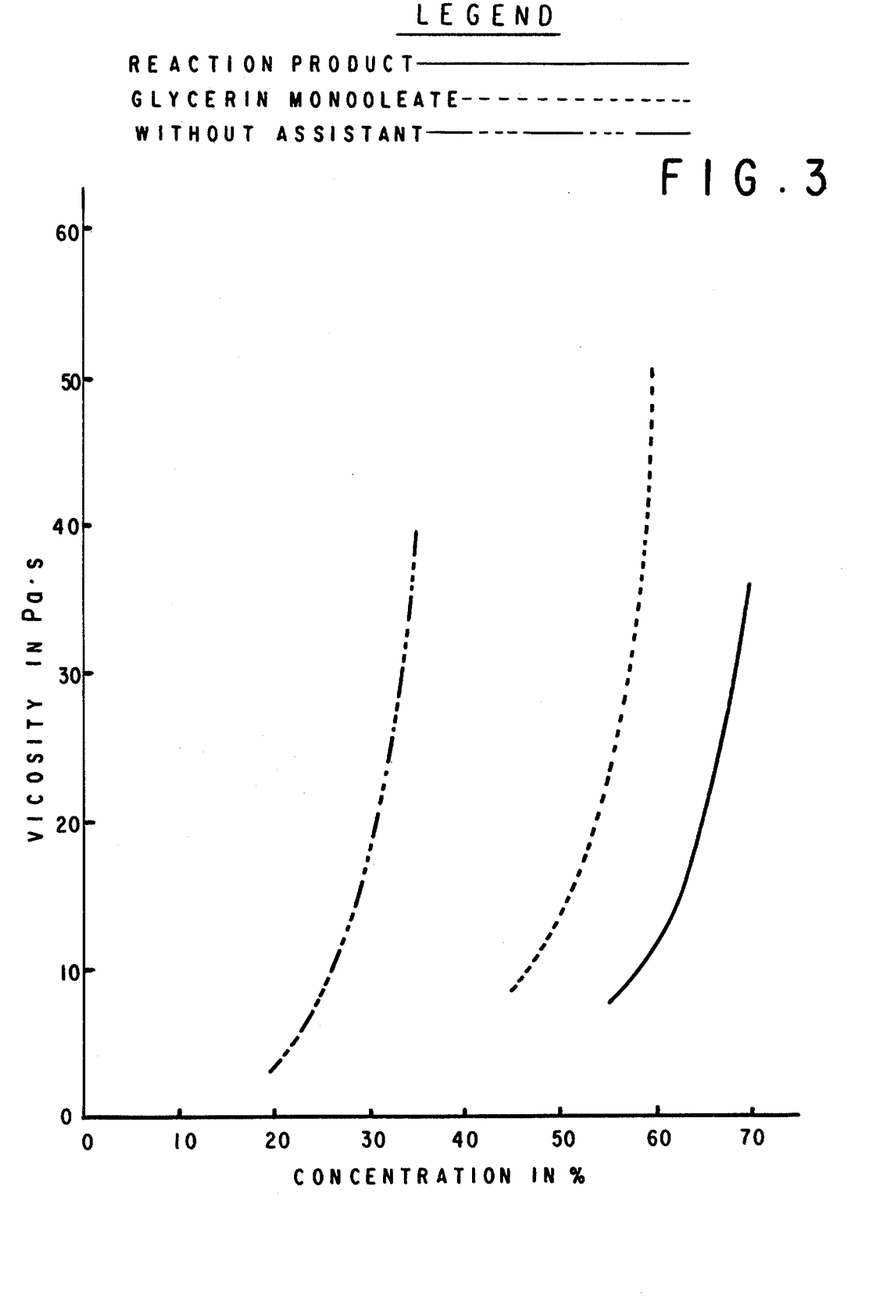
FIG. 3 is a graph of the above plot with the reaction product of Example 2 using iron oxide red.

The results compiled in Table 5 and FIG. 3 show the advantageous effect of Reaction Product 2.

TABLE 5

| Example | Suspension Assistant Type | % by weight based on the pigment | Composition in % by wt. Iron oxide red | DOP | Assistant | Viscosity+ Pa.s | Appearance |
|---|---|---|---|---|---|---|---|
| 9 | reaction product 2 | 2.5 | 70 | 28.2 | 1.8 | 36.5 | liquid, slight structural viscosity |
| | | 2.5 | 65 | 33.4 | 1.6 | 24.5 | liquid |
| | | 2.5 | 60 | 38.5 | 1.5 | 11.7 | " |
| | | 2.5 | 55 | 53.6 | 1.4 | 7.3 | " |
| Comparison Example 9a | glyceryl monooleate | 2.5 | 60 | 38.5 | 1.5 | 50.3 | strong, structural viscosity |
| | | 2.5 | 55 | 53.6 | 1.4 | 22.3 | liquid, moderate structural viscosity |
| | | 2.5 | 50 | 48.7 | 1.3 | 13.7 | liquid, slight structural viscosity |
| | | 2.5 | 45 | 53.9 | 1.1 | 8.4 | liquid, slight structural viscosity |
| Comparison Example 9b | blind test | — | 35 | 65 | — | 40 | strong, structural viscosity |
| | | — | 30 | 70 | — | 17.9 | liquid, slight |

TABLE 5-continued

| Example | Suspension Assistant Type | % by weight based on the pigment | Composition in % by wt. Iron oxide red | DOP | Assistant | Viscosity+ Pa.s | Appearance |
|---|---|---|---|---|---|---|---|
| | | — | 25 | 75 | — | 8.4 | structural viscosity liquid, slight structural viscosity |
| | | — | 20 | 80 | — | 3.3 | liquid |

+The viscosities were measured with a Brookfield LVT instrument spindle No. 4, at 12 rpm and 20° C.

EXAMPLE 10 and COMPARISON EXAMPLE 10a

Analogous to Example 6, pastes with 75% by weight of pigment and, based on the pigment, 1.25% by weight, 2.5% by weight and 5% by weight of Reaction Product 2 were prepared from a commercial chrome yellow (monoclinic, mixed crystals of short needles of the formula x PbCrO$_4$. yPbSO$_4$ with an average particle size of 0.16$\mu$) and the remainer to 100% by weight of a predominantly paraffinic mineral oil of the boiling range 280° to 305° C.

A pigment paste with the same starting materials, but without the addition of an assistant, was prepared in Comparison Example 10a. Only a maximum of 40% by weight pigment could be incorporated in this case. The obtained paste was diluted with mineral oil to pigment concentrations of 35 and 30 percent by weight.

The properties of the pigment pastes are shown in Table 6.

TABLE 6

| Example | Suspension Assistant Type | % by weight based on the pigment | Composition in % by wt. Chrome yellow | Mineral oil | Assistant | Viscosity+ Pa.s | Appearance |
|---|---|---|---|---|---|---|---|
| 10 | reaction product 2 | 1.25 | 75 | 24.1 | 0.9 | 8.6 | liquid, slight structural viscosity |
| | | 2.5 | 75 | 23.1 | 1.9 | 1.8 | liquid |
| | | 5.0 | 75 | 21.2 | 3.8 | 1.0 | liquid |
| Comparison Example 10a | blind test | — | 40 | 60 | — | not measureable | thick paste |
| | | — | 35 | 65 | — | 25 | structurally viscous paste |
| | | — | 30 | 70 | — | 9 | still structurally viscous paste |

+The viscosities were measured with a Brookfield LVT instrument spindle No. 4, at 12 rpm and 20° C.

EXAMPLE 11 and COMPARISON EXAMPLES 11a and 11b

Example 6 was repeated with the modification that Reaction Product 3 was used instead of Reaction Product 1.

Glyceryl monooleate was used as comparison substance in Comparison Example 11a. Comparison Example 11b was carried out without any assistant.

The results of this test series are compiled in Table 7.

TABLE 7

| Example | Suspension Assistant Type | % by weight based on the pigment | Composition in % by wt. TiO$_2$ | DOP | Assistant | Viscosity+ Pa.s | Appearance |
|---|---|---|---|---|---|---|---|
| 11 | reaction product 3 | 2.5 | 65 | 33.4 | 1.6 | 10.2 | liquid |
| Comparison Example 11a | glyceryl monooleate | 2.5 | 65 | 33.4 | 1.6 | not measureable | thick paste |
| Comparison Example 11b | blind test | — | 65 | 35 | — | not measureable | crumbly paste |

+The viscosities were measured with a Brookfield LVT-instrument, spindle No. 4 at 30 rpm and 20° C.

EXAMPLE 12

Example 7 was repeated with the modification that Reaction Product 4 was used instead of Reaction Product 2. The results obtained with it are summarized in Table 8.

TABLE 8

| Example | Suspension Assistant Type | % by weight based on the pigment | Composition in % by wt. TiO2 | DOP | Assistant | Viscosity+ Pa.s | Appearance |
|---|---|---|---|---|---|---|---|
| 12 | reaction product 4 | 2.5 | 70 | 28.2 | 1.8 | 21.2 | liquid |
|  |  | 2.5 | 65 | 33.4 | 1.6 | 10.2 | liquid |
|  |  | 2.5 | 60 | 38.5 | 1.5 | 7.2 | liquid |
|  |  | 2.5 | 55 | 53.6 | 1.4 | 4.6 | liquid |

+The viscosities were measured with a Brookfield LVT-instrument, spindle No. 4, at 12 rpm and 20° C.

EXAMPLE 13

Example 7 was repeated with the modification that Reaction Product 5 was used instead of Reaction Product 2. The lightest possible pigment concentration was 65 percent by weight. The properties of the obtained pigment pastes are shown in Table 9.

TABLE 9

| Example | Suspension Assistant Type | % by weight based on the pigment | Composition in % by wt. TiO2 | DOP | Assistant | Viscosity+ Pa.s | Appearance |
|---|---|---|---|---|---|---|---|
| 13 | reaction product 5 | 2.5 | 65 | 33.4 | 1.6 | 27.5 | liquid, slightly structural viscosity |
|  |  | 2.5 | 60 | 38.5 | 1.5 | 13.0 | liquid |
|  |  | 2.5 | 55 | 43.6 | 1.4 | 7.5 | liquid |
|  |  | 2.5 | 50 | 48.7 | 1.3 | 5.0 | liquid |

+The viscosities were measured with a Brookfield LVT-instrument, spindle No. 4 at 12 rpm and 20° C.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. The process for the preparation of high concentration, low viscosity liquid pigments pastes consisting essentially of mixing inorganic pigments, a substantially, non-volatile liquid organic media, a suspension assistant, and, optionally, inorganic fillers, wherein said liquid pigment pastes have a concentration of inorganic pigment of at least 50% and said suspension assistant is present in an amount of from 0.5% to 20% by weight, based on the weight of said inorganic pigment and is a reaction product of the reaction of:

(A) unsaturated acidic compounds selected from the group consisting of itaconic acid, an ethene dicarboxylic acid having the formula:

and an ethene dicarboxylic acid anhydride having the formula:

wherein $R_1$ and $R_2$ are members selected from the group consisting of hydrogen and methyl, and (B) an unsaturated ester having the formula:

wherein $R_3$ and $R_4$ are members having 14 to 20 carbon atoms selected from the group consisting of alkenyl, alkadienyl, alkatrienyl and mixtures thereof, and A represents the acyl of an acid selected from the group consisting of itaconic acid, said ethene dicarboxylic acid, and an alkanedioic acid having the formula:

$$HOOC-(CH_2)_n-COOH$$

wherein n is an integer from 1 to 10, which reaction product is produced by heating said component A and said component B in a weight ratio of 1:7 to 1:35 for from 1 to 25 hours at a temperature in the range of 200° C. to 250° C.

2. The process of claim 1 wherein $R_3$ and $R_4$ are alcohol radicals selected from the group consisting of technical grade oleyl alcohol and technical grade soybean alcohol.

3. The process of claim 1 wherein said component A is maleic acid anhydride.

4. The process of claim 1 wherein said substantially non-volatile liquid organic media is a phthalic acid ester.

5. The process of claim 1 wherein said substantially non-volatile liquid organic media is a mineral oil.

6. The process of claim 1 wherein said suspension assistant is employed in an amount of from 1% to 10% by weight, based on the weight of said pigment.

7. A high concentration, low-viscosity liquid pigment paste having a concentration of pigment of at least 50% produced by the process of claim 1.

* * * * *